United States Patent
Lippert

(10) Patent No.: US 11,838,761 B2
(45) Date of Patent: *Dec. 5, 2023

(54) FRAUD DETECTION BASED ON GEOLOCATION DATA

(71) Applicant: Allstate Insurance Company, Northbrook, IL (US)

(72) Inventor: Keith Alan Lippert, Belfast (IE)

(73) Assignee: Allstate Insurance Company, Northbrook, IL (US)

( * ) Notice: Subject to any disclaimer, the term of this patent is extended or adjusted under 35 U.S.C. 154(b) by 279 days.

This patent is subject to a terminal disclaimer.

(21) Appl. No.: 17/229,052

(22) Filed: Apr. 13, 2021

(65) Prior Publication Data

US 2021/0235274 A1 Jul. 29, 2021

Related U.S. Application Data

(63) Continuation of application No. 16/738,032, filed on Jan. 9, 2020, now Pat. No. 11,012,861.

(51) Int. Cl.
*H04W 12/63* (2021.01)
*H04W 4/02* (2018.01)
(Continued)

(52) U.S. Cl.
CPC ............ *H04W 12/63* (2021.01); *B60W 40/09* (2013.01); *G07C 5/008* (2013.01); *H04L 63/102* (2013.01);
(Continued)

(58) Field of Classification Search
CPC ..... H04W 4/025; H04W 12/63; H04W 12/06; H04W 12/61; H04W 4/40; H04L 63/107; H04L 63/102
(Continued)

(56) References Cited

U.S. PATENT DOCUMENTS 6,948,656 B2 9/2005 Williams
7,673,793 B2 3/2010 Greene et al.
(Continued)

FOREIGN PATENT DOCUMENTS

CN 101729982 A * 6/2010
CN 102325151 A * 1/2012
(Continued)

OTHER PUBLICATIONS

How Machine Learning Facilitates Fraud Detection? Maruti Techlabs 16 pages.
(Continued)

*Primary Examiner* — David Q Nguyen
(74) *Attorney, Agent, or Firm* — Dinsmore & Shohl LLP

(57) ABSTRACT

Methods, computer-readable media, software, and apparatuses may retrieve, from a computing device at a vehicle, driving data, and determine, based on the driving data, a range of time when a driver of the vehicle has a low likelihood of accessing a web resource over a network. An online activity may be detected for an account associated with the driver. In some aspects, a time of the online activity may be compared to the range of time. Based upon a determination that the time of the online activity is within the range of time, a potentially unauthorized activity may be identified. In some aspects, in response to the potentially unauthorized activity, one or more steps may be triggered to protect the driver from the potentially unauthorized activity.

20 Claims, 7 Drawing Sheets

(51) Int. Cl.
  *H04W 12/06* (2021.01)
  *H04L 9/40* (2022.01)
  *B60W 40/09* (2012.01)
  *G07C 5/00* (2006.01)
(52) U.S. Cl.
  CPC .......... *H04L 63/107* (2013.01); *H04W 4/025* (2013.01); *H04W 12/06* (2013.01)
(58) Field of Classification Search
  USPC .................. 701/1, 31.5; 455/404.2, 405
  See application file for complete search history.

(56) References Cited

U.S. PATENT DOCUMENTS

| | | | |
|---|---|---|---|
| 8,295,898 | B2 | 10/2012 | Ashfield et al. |
| 8,374,634 | B2 | 2/2013 | Dankar et al. |
| 8,788,389 | B1 | 7/2014 | Fernandes |
| 8,788,419 | B2 | 7/2014 | Samuels et al. |
| 8,849,255 | B2 | 9/2014 | Choti et al. |
| 9,053,513 | B2 | 6/2015 | Meredith et al. |
| 9,516,053 | B1 | 12/2016 | Muddu et al. |
| 9,519,934 | B2 | 12/2016 | Calman et al. |
| 9,715,713 | B1 | 7/2017 | Humphrey et al. |
| 9,753,946 | B2 | 9/2017 | Dan et al. |
| 9,928,500 | B2 | 3/2018 | Gum |
| 10,285,018 | B2 | 5/2019 | Cansino et al. |
| 10,373,160 | B2 | 8/2019 | Ranganathan |
| 10,504,094 | B1 | 12/2019 | Gaudin et al. |
| 10,938,825 | B2* | 3/2021 | Herrmann ............ G01C 21/28 |
| 2004/0193918 | A1 | 9/2004 | Green et al. |
| 2009/0199296 | A1 | 8/2009 | Xie et al. |
| 2011/0046845 | A1 | 2/2011 | Kozlay |
| 2013/0073387 | A1* | 3/2013 | Heath ................ G06Q 30/02 705/14.53 |
| 2013/0332004 | A1* | 12/2013 | Gompert ............. G07C 5/085 701/1 |
| 2014/0168436 | A1 | 6/2014 | Pedicino |
| 2015/0186891 | A1 | 7/2015 | Wagner et al. |
| 2015/0193989 | A1* | 7/2015 | Simon ................. G07C 5/008 701/31.5 |
| 2015/0227934 | A1 | 8/2015 | Chauhan |
| 2016/0337294 | A1 | 11/2016 | Garg et al. |
| 2017/0098220 | A1 | 4/2017 | Kumawat et al. |
| 2017/0300975 | A1 | 10/2017 | Iannace et al. |
| 2018/0108015 | A1 | 4/2018 | Rogas |
| 2018/0205754 | A1 | 7/2018 | North |
| 2018/0248863 | A1* | 8/2018 | Kao .................... H04L 63/102 |
| 2018/0270241 | A1* | 9/2018 | Herrmann ............ G06F 21/316 |
| 2018/0351980 | A1 | 12/2018 | Galula et al. |
| 2019/0230162 | A1* | 7/2019 | Lauer ................... H04W 4/027 |
| 2019/0268333 | A1 | 8/2019 | Willmann |
| 2019/0270457 | A1 | 9/2019 | Chen et al. |
| 2019/0279212 | A1 | 9/2019 | Brown et al. |
| 2019/0289016 | A1* | 9/2019 | Malan ................. H04L 63/107 |
| 2019/0295087 | A1 | 9/2019 | Jia et al. |
| 2019/0391594 | A1 | 12/2019 | Takano et al. |
| 2020/0074492 | A1 | 3/2020 | Scholl et al. |
| 2020/0125868 | A1 | 4/2020 | Naamani et al. |
| 2020/0228355 | A1 | 7/2020 | Huang et al. |
| 2020/0294345 | A1 | 9/2020 | Jiang |
| 2020/0311784 | A1 | 10/2020 | Jiang |

FOREIGN PATENT DOCUMENTS

| | | | | |
|---|---|---|---|---|
| CN | 102354197 | A | * | 2/2012 |
| CN | 108111363 | A | * | 6/2018 ............ H04L 41/06 |
| EP | 3257226 | B1 | * | 7/2018 ............ H04L 63/08 |
| WO | 2014160296 | A1 | | 10/2014 |

OTHER PUBLICATIONS

How to Prevent Fraud—Chapter 2: Device ID and IP Address Analysis Sift 9 pages.
Fraud Detection by Monitoring Customer Behavior and Activities Singh/Singh International Journal of Computer Applications (0975-8887) vol. III—No. 11, Feb. 2015 10 pages.
Mobile Payment Security Patent Asks If Flexibility Could Be a Better Answer PYMNTS.com Aug. 19, 2014 14 pages.
Fraud Detection: How Machine Learning Systems Help Reveal Scams in Fintech, Healthcare, and eCommerce altexsoft.com https://www.altexsoft.com/whitepapers/fraud-detection-how-machine-learning-systems-help-reveal-scams-in-fintech-heathcare-and-ecommerce/ 21 pages.
Feb. 8, 2021—U.S. Notice of Allowance—U.S. Appl. No. 16/738,032.
Mar. 19, 2021—(WO) Internatonal Search Report & Written Opinion—PCT/US21/012180.
"Reduce Fuel Card Fraud and Unauthorized Charges with Driver Monitoring", P. Fleet, P Fleet Article, Jul. 12, 2017, retrievew from <URL: https://www.fleet.com/blog/reduce-fuel-card-fraud-with-driver-monitoring>, entire.
"Smartphone Use While Driving: A Simulator Study", Basacik et al., Project Report PPR592, Transport Research laboratory, 2011, retrieved from <URL: https://merritt.cdlib.org/d/ark:%2F13030%2Fm5pr7t9s/1/producer%2F779410002.pdf>.

\* cited by examiner

FRAUD DETECTION BASED ON GEOLOCATION DATA

This application is a continuation of U.S. patent application Ser. No. 16/738,032, filed on Jan. 9, 2020, the disclosure of which is hereby incorporated by reference in its entirety.

FIELD OF ART

Aspects of the disclosure generally relate to methods and computer systems, including one or more computers particularly configured and/or executing computer software. More specifically, aspects of this disclosure relate to systems for receiving, analyzing and processing driving data to determine a range of time when a driver of a vehicle has a low likelihood of accessing a web resource over a wired or wireless network.

BACKGROUND

Detecting and preventing financial fraud in insurance and/or financial institutions has become a priority, especially with a rise in online transactions. Generally, financial fraud may lead to loss of wealth, personal or private information, data, and so forth. Many such activities may comprise accessing a person's financial account to misappropriate funds and/or personal information. When such fraudulent activities are undetected and/or not mitigated, businesses may incur increased losses, including, but not limited to, an erosion of a customer base.

BRIEF SUMMARY

In light of the foregoing background, the following presents a simplified summary of the present disclosure in order to provide a basic understanding of some aspects of the invention. This summary is not an extensive overview of the invention. It is not intended to identify key or critical elements of the invention or to delineate the scope of the invention. The following summary merely presents some concepts of the invention in a simplified form as a prelude to the more detailed description provided below.

Aspects of the disclosure address one or more of the issues mentioned above by disclosing methods, computer readable storage media, software, systems, and apparatuses for fraud detection based on geolocation data. In particular, based on driving data, ranges of time may be determined when a driver of a vehicle has a low likelihood of accessing a web resource over a network. Accordingly, when an online activity is detected during such ranges of time, it may be an unauthorized activity.

In some aspects, a time range determination system may include at least one processor and a memory unit storing computer-executable instructions. In some embodiments, the computer-executable instructions may be stored in one or more non-transitory computer-readable media. The time range determination system may be configured to, in operation, retrieve, by a computing device at a vehicle, driving data. The time range determination system may, in operation, determine, based on the driving data, a range of time when a driver of the vehicle has a low likelihood of accessing a web resource over a network. The time range determination system may, in operation, detect an online activity for an account associated with the driver. The time range determination system may, in operation, compare a time of the online activity to the range of time. The time range determination system may, in operation, based upon a determination that the time of the online activity is within the range of time, identify a potentially unauthorized activity. The time range determination system may be configured to, in operation, trigger, in response to the potentially unauthorized activity, one or more steps to protect the driver from the potentially unauthorized activity.

In other aspects, the time range determination system may also be configured to, in operation, associate, by the computing device and with the range of time, a confidence level indicative of a strength of determining the range of time, and where the identifying the potentially unauthorized activity may be based on the confidence level. In some aspects, the time range determination system may, in operation, base the confidence level on the driving data.

In some aspects, the time range determination system may, in operation, determine, based on the driving data, a first geographical region in which the vehicle is located and determine, based on the first geographical region, a first range of IP addresses. In some aspects, the time range determination system may, in operation, identify, based on the online activity, a second range of IP addresses, and where the triggering of the one or more steps to protect the driver from the potentially unauthorized activity may be based upon a determination that the first range of IP addresses does not overlap the second range of IP addresses.

In other aspects, the driving data may include one or more of geo-location data, an IP address of the computing device in the vehicle, data indicative of whether the computing device is in possession of the driver or a passenger of the vehicle, speed of the vehicle, acceleration data associated with the vehicle, and/or biometric data associated with the driver or the passenger.

In other aspects, the one or more steps may include sending an alert notification to the driver.

In other aspects, the one or more steps may include preventing the potentially unauthorized activity.

In other aspects, the one or more steps may include providing, to a third party, the range of time as a verification service for online activities.

Methods and systems of the above-referenced embodiments may also include other additional elements, steps, computer-executable instructions, or computer-readable data structures. In this regard, other embodiments are disclosed and claimed herein as well. The details of these and other embodiments of the present invention are set forth in the accompanying drawings and the description below. Other features and advantages of the invention will be apparent from the description, drawings, and claims.

BRIEF DESCRIPTION OF THE DRAWINGS

The present invention is illustrated by way of example and is not limited by the accompanying figures in which like reference numerals indicate similar elements and in which.

DETAILED DESCRIPTION

In accordance with various aspects of the disclosure, methods, computer-readable media, software, and apparatuses are disclosed for determining a range of time when a driver of a vehicle has a low likelihood of accessing a web resource. As described herein, fraud detection and/or prevention may be facilitated if it is known that a person is unable to have performed a transaction or otherwise accessed a system during a range of time. Although financial institutions implement various security infrastructure to prevent fraud, such safeguards may be circumvented, and a consumer's account may be vulnerable to financial fraud. Detecting such fraudulent activity automatically in a timely manner, and with a greater level of confidence, may reduce a risk of financial fraud.

In some instances, unauthorized activity may go undetected, and valuable time may elapse before such activity may be detected, reported, and/or mitigated. As a result, perpetrators of such unauthorized activities may remain out of reach of law enforcement authorities. Also, for example, many enterprises may lack technology to determine if an unauthorized activity may have occurred. As another example, enterprises may lack an ability to independently verify if an unauthorized activity may have occurred. In some instances, a business organization may have to rely on a customer's notification of unauthorized activity, and may expend time and/or resources to verify such claims.

In the following description of the various embodiments of the disclosure, reference is made to the accompanying drawings, which form a part hereof, and in which is shown by way of illustration, various embodiments in which the disclosure may be practiced. It is to be understood that other embodiments may be utilized and structural and functional modifications may be made.

Figure 1:
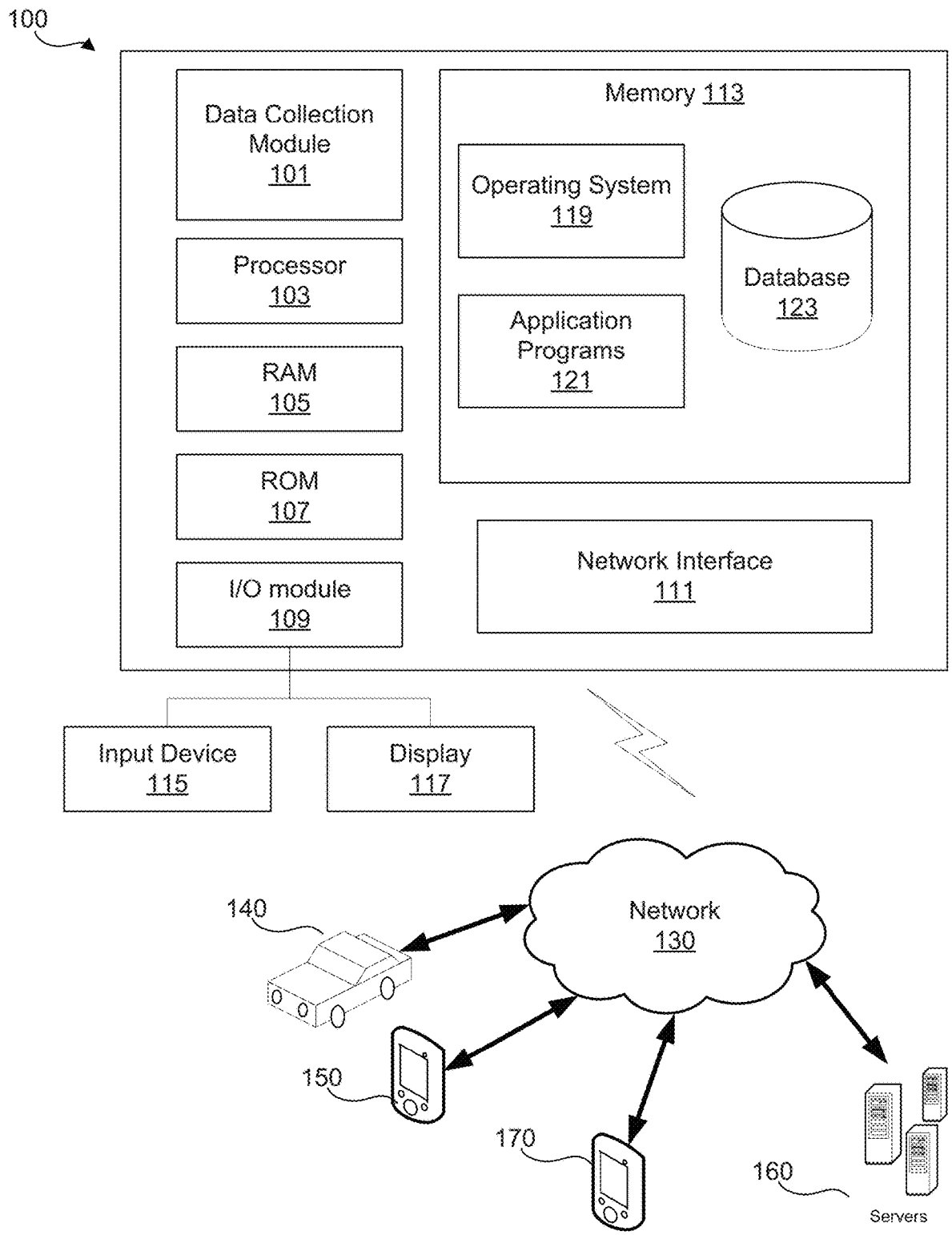
FIG. 1 illustrates an example computing environment including a time range determination device that may be used in accordance with one or more aspects described herein.

In one or more arrangements, aspects of the present disclosure may be implemented with a computing device. FIG. 1 illustrates a block diagram of an example computing environment including time range determination device 100 that may be used in accordance with one or more aspects described herein. The time range determination device 100 may be a computing device, such as a personal computer (e.g., a desktop computer), server, laptop computer, notebook, tablet, smartphone, etc. The time range determination device 100 may have a data collection module 101 for retrieving and/or analyzing data as described herein. The data collection module 101 may be implemented with one or more processors and one or more storage units (e.g., databases, RAM, ROM, and other computer-readable media), one or more application specific integrated circuits (ASICs), and/or other hardware components (e.g., resistors, capacitors, power sources, switches, multiplexers, transistors, inverters, etc.). Throughout this disclosure, the data collection module 101 may refer to the software and/or hardware used to implement the data collection module 101. In cases where the data collection module 101 includes one or more processors, such processors may be specially configured to perform the processes disclosed herein. Additionally, or alternatively, the data collection module 101 may include one or more processors configured to execute computer-executable instructions, which may be stored on a storage medium, to perform the processes disclosed herein. In some examples, time range determination device 100 may include one or more processors 103 in addition to, or instead of, the data collection module 101. The processor(s) 103 may be configured to operate in conjunction with data collection module 101. Both the data collection module 101 and the processor(s) 103 may be capable of controlling operations of the time range determination device 100 and its associated components, including RAM 105, ROM 107, an input/output (I/O) module 109, a network interface 111, and memory 113. For example, the data collection module 101 and processor(s) 103 may each be configured to read/write computer-executable instructions and other values from/to the RAM 105, ROM 107, and memory 113.

The I/O module 109 may be configured to be connected to an input device 115, such as a microphone, keypad, keyboard, touchscreen, and/or stylus through which a user of the time range determination device 100 may provide input data. The I/O module 109 may also be configured to be connected to a display device 117, such as a monitor, television, touchscreen, etc., and may include a graphics card. For example, the I/O module 109 may be configured to receive biometric data from a user. The display device 117 and input device 115 are shown as separate elements from the time range determination device 100; however, they may be within the same structure. On some time range determination devices 100, the input device 115 may be operated by a driver of a vehicle to interact with the data collection module 101, including providing information about customer preferences, customer information, account information, etc., as described in further detail below. System administrators may use the input device 115 to make updates to the data collection module 101, such as software updates. Meanwhile, the display device 117 may assist the system administrators and users to confirm/appreciate their inputs.

The memory 113 may be any computer-readable medium for storing computer-executable instructions (e.g., software). The instructions stored within memory 113 may enable the time range determination device 100 to perform various functions. For example, memory 113 may store software used by the time range determination device 100, such as an operating system 119 and application programs 121, and may include an associated database 123.

Although not shown in FIG. 1, various elements within memory 113 or other components in the time range determination device 100, may include one or more caches, for example, CPU caches used by the processing unit 103, page caches used by the operating system 119, disk caches of a hard drive, and/or database caches used to cache content from database 123. For embodiments including a CPU cache, the CPU cache may be used by one or more processors in the processor 103 to reduce memory latency and access time. In such examples, the processor 103 may retrieve data from or write data to the CPU cache rather than reading/writing to memory 113, which may improve the speed of these operations. In some examples, a database cache may be created in which certain data from a central database such as, for example, one or more enterprise servers 160 (e.g., a claims database, an underwriting database, insurance customer database, local information database, etc.) is cached in a separate smaller database on an application server separate from the database server. For instance, in a multi-tiered application, a database cache on an application server can reduce data retrieval and data manipulation time by not needing to communicate over a network with a back-end database server such as, for example, one or more enterprise servers 160. These types of caches and others may be included in various embodiments, and may provide potential advantages in certain implementations of retrieving and analyzing driving data, such as faster response times and less dependence on network conditions when transmitting/receiving driving data from a vehicle 140 (e.g., from vehicle-based devices such as on-board vehicle computers, short-range vehicle communication systems, telematics devices), data from one or more enterprise servers 160, etc.

The network interface 111 may allow time range determination device 100 to connect to and communicate with a network 130. The network 130 may be any type of network, including a local area network (LAN) and/or a wide area network (WAN), such as the Internet, a cellular network, or satellite network. Through network 130, time range determination device 100 may communicate with one or more other computing devices such as a user device 150 (e.g., laptops, notebooks, smartphones, tablets, personal computers, servers, vehicles, home management devices, home security devices, smart appliances, etc.) associated with a driver of vehicle 140. Through network 130, time range determination device 100 may communicate with one or more unauthorized computing devices 170 (e.g., devices used for conducting unauthorized and/or potentially fraudulent activity). Through network 130, time range determination device 100 may communicate with one or more enterprise servers 160 to exchange related information and data.

Network interface 111 may connect to the network 130 via communication lines, such as coaxial cable, fiber optic cable, etc., or wirelessly using a cellular backhaul or a wireless standard, such as IEEE 802.11, IEEE 802.15, IEEE 802.16, etc. Further, network interface 111 may use various protocols, including TCP/IP, Ethernet, File Transfer Protocol (FTP), Hypertext Transfer Protocol (HTTP), etc., to communicate with user device 150, unauthorized computing device 170, and enterprise servers 160.

It will be appreciated that the network connections shown are illustrative and other means of establishing a communications link between the computers may be used. The existence of any of various network protocols such as Transmission Control Protocol/Internet Protocol ("TCP/IP"), Ethernet, File Transfer Protocol ("FTP"), Hypertext Transfer Protocol ("HTTP") and the like, and of various wireless communication technologies such as the Global System for Mobile Communications ("GSM"), Code Division Multiple Access ("CDMA"), Wi-Fi, Long-Term Evolution ("LTE"), and Worldwide Interoperability for Microwave Access ("WiMAX"), is presumed, and the various computing devices and mobile device location and configuration system components described herein may be configured to communicate using any of these network protocols or technologies.

Figure 2:
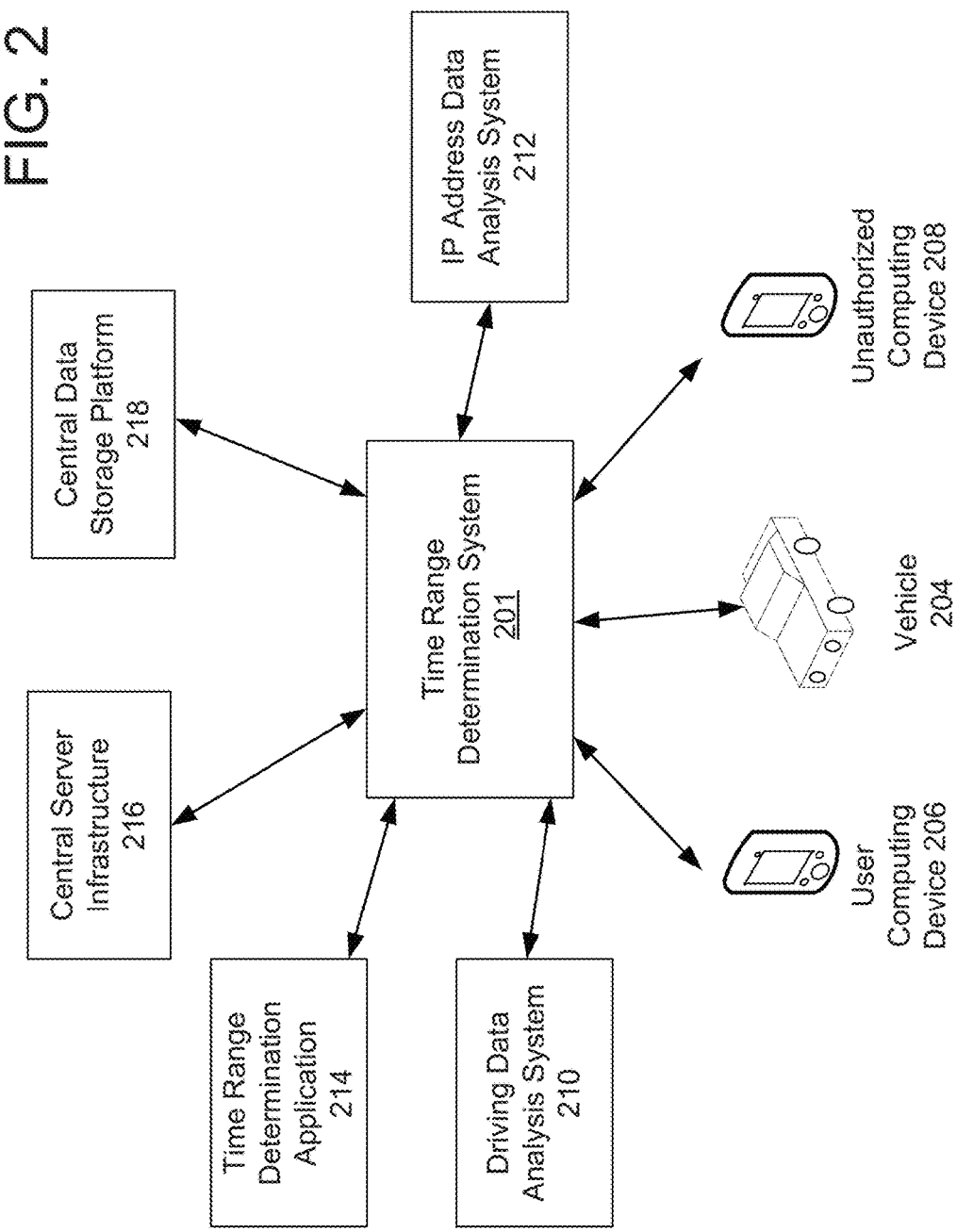
FIG. 2 shows a block diagram illustrating the system architecture for a time range determination system in accordance with one or more aspects described herein.

FIG. 2 shows a block diagram illustrating system architecture 200 for a time range determination system in accordance with one or more aspects described herein. A time range determination system 201 may receive driving data from a vehicle 204 and/or a user computing device 206 associated with a driver and/or passenger of vehicle 204. In some instances, the time range determination system 201 may be or include one or more components discussed with respect to a time range determination device 100, as shown in FIG. 1. In some instances, time range determination system 201 may be housed on vehicle 204 and/or user computing device 206. The vehicle 204 and/or user computing device 206 may be equipped with time range determination system 201 to perform the processes described herein, and may be equipped to communicate with devices, servers, databases, etc. over a network. In some embodiments, vehicle 204 and/or user computing device 206 may include a server and/or a network interface that facilitates communications over private and public networks. In some embodiments, time range determination system 201 may collect information from and transmit information to each of the various applications, databases, devices, and backend servers described in FIG. 2.

In some embodiments, time range determination system 201 may retrieve driving data from a computing device at a vehicle 204 and/or user computing device 206 associated with a driver and/or passenger of vehicle 204. For example, vehicle 204 may be equipped with a telematics device (e.g., an in-vehicle telematics device) that provides various telematics information to users and/or service providers regarding vehicle location, direction of travel, velocity, route, and/or destination. In some embodiments, time range determination system 201 may track a driver's location through telematics information. In some embodiments, an in-vehicle telematics device may include a processor with a display or graphical interface that receives and/or collects driving data and/or telematics information and provides additional information based on the driving data. The driving data and/or telematics information may include, but not be limited to: location, instantaneous velocity, average velocity, route, destination, braking, swerving, etc. The in-vehicle telematics device, which may be configured to receive real-time vehicle data, may provide time range determination system 201 with visual and/or audible in-vehicle information. In some embodiments, driving data may include biometric data for a driver of vehicle 204. For example, an electro-cardiogram ("ECG") meter in a steering wheel of vehicle 204 may identify a unique ECG signature for a driver of vehicle 204. The in-vehicle telematics device may process real-time and/or near real-time data and then provide the processed information in a meaningful way for display via a graphical user interface ("GUI"). The in-vehicle telematics device may receive and/or collect driving data and store summary information for and/or about the driver.

The in-vehicle telematics device may communicate with a data collection device or on-board diagnostics port of a vehicle to collect the driving data. In another exemplary embodiment, the in-vehicle telematics device may acquire the driving data directly from a device, such as user computing device 206 (e.g., a smart phone, tablet computer, or vehicle navigation system via a built-in accelerometer and/or a Global Positioning System ("GPS"), and so forth).

Time range determination system 201 may collect data from unauthorized computing device 208 that may be utilized to transact, or attempt to transact, with a financial institution in an unauthorized manner. The data collected may include location data, an Internet Protocol Address ("IP address"), information related to time when an unauthorized activity occurred, and so forth. Generally, an IP address provides host or network interface identification as well as location addressing.

Time range determination system 201 may retrieve IP address data from one or more publicly available sources (e.g., Internet Assigned Numbers Authority ("IANA") and/or regional internet registries). The IP address data may include a list of geographical regions with associated IP addresses. Such a list may be available in a searchable format. In some aspects, IP address data analysis system 212 may convert retrieved IP address data into a searchable format. Also, for example, IP address data analysis system 212 may be configured to receive, based on the driving data, a first geographical region in which the vehicle is located, and may determine a first range of IP addresses based on the first geographical region. Also, IP address data analysis system 212 may be configured to identify, based on the online activity (e.g., by unauthorized computing device 208), a second range of IP addresses (e.g., associated with unauthorized computing device 208). As another example, IP address data analysis system 212 may be configured to determine if the first range of IP addresses overlaps the second range of IP addresses.

The driving data may be analyzed by driving data analysis system 210. For example, driving data analysis system 210 may analyze location data from vehicle 204 and/or user computing device 206 to identify a geographical location of vehicle 204 and/or user computing device 206. As another example, driving data analysis system 210 may analyze data related to velocity of vehicle 204 to determine if vehicle 204 is on a highway, a city road, a country road, and so forth.

Time range determination application 214 may be configured to determine a range of time when a driver of vehicle 204 has a low likelihood of accessing a web resource over a network. For example, time range determination system 201 may utilize driving data related to a route, origin, destination, and so forth, to determine a range of time when a driver of vehicle 204 may have been unable or unlikely to access a web resource (e.g., while driving, while engaged with a navigation system or application, or the like).

Central server infrastructure 216 may be configured to host, execute, manage, and/or otherwise provide a computing platform for various computing devices and/or enterprise applications. In some instances, central server infrastructure 216 may be configured to provide various enterprise and/or back-office computing functions for an enterprise organization, such as an insurance organization, a financial institution, and so forth. For example, central server infrastructure 216 may include various servers that host applications that maintain, support, process, and/or provide account information associated with a user, such as driving history, driving patters, biometric data, financial account information including type of insurance, policy coverage, account balances, transaction history, online activities and other account access data, and/or other information. Additionally, or alternatively, central server infrastructure 216 may receive instructions from time range determination system 201 and execute the instructions in a timely manner.

Central data storage platform 218 may be configured to store and/or otherwise store data, including account information associated with a user, such as driving data received from a vehicle and/or a user computing device, IP address data, driving history, driving patterns, biometric data, insurance data (e.g., policy coverage, account balances, transaction history, etc.), online activities and other account access data, and/or data otherwise provided by central server infrastructure 216. Also, for example, central data storage platform 218 may be configured to store and/or otherwise maintain information associated with determined ranges of time when a driver is unlikely or unable to access online resources. For example, central data storage platform 218 may be configured to store and/or otherwise maintain a list of associations of individuals and determined ranges of time when that individual is unlikely or unable to access online resources. As another example, central data storage platform 218 may be configured to store and/or otherwise maintain geolocation profiles for individuals. Additionally, or alternatively, central server infrastructure 216 may load data from central data storage platform 218, manipulate and/or otherwise process such data, and return modified data and/or other data to central data storage platform 218.

Although driving data analysis system 210, IP address data analysis system 212, time range determination application 214, central server infrastructure 216, and central data storage platform 218 are shown as separate elements from time range determination system 201, one or more of them may be within the same structure.

Figure 3:
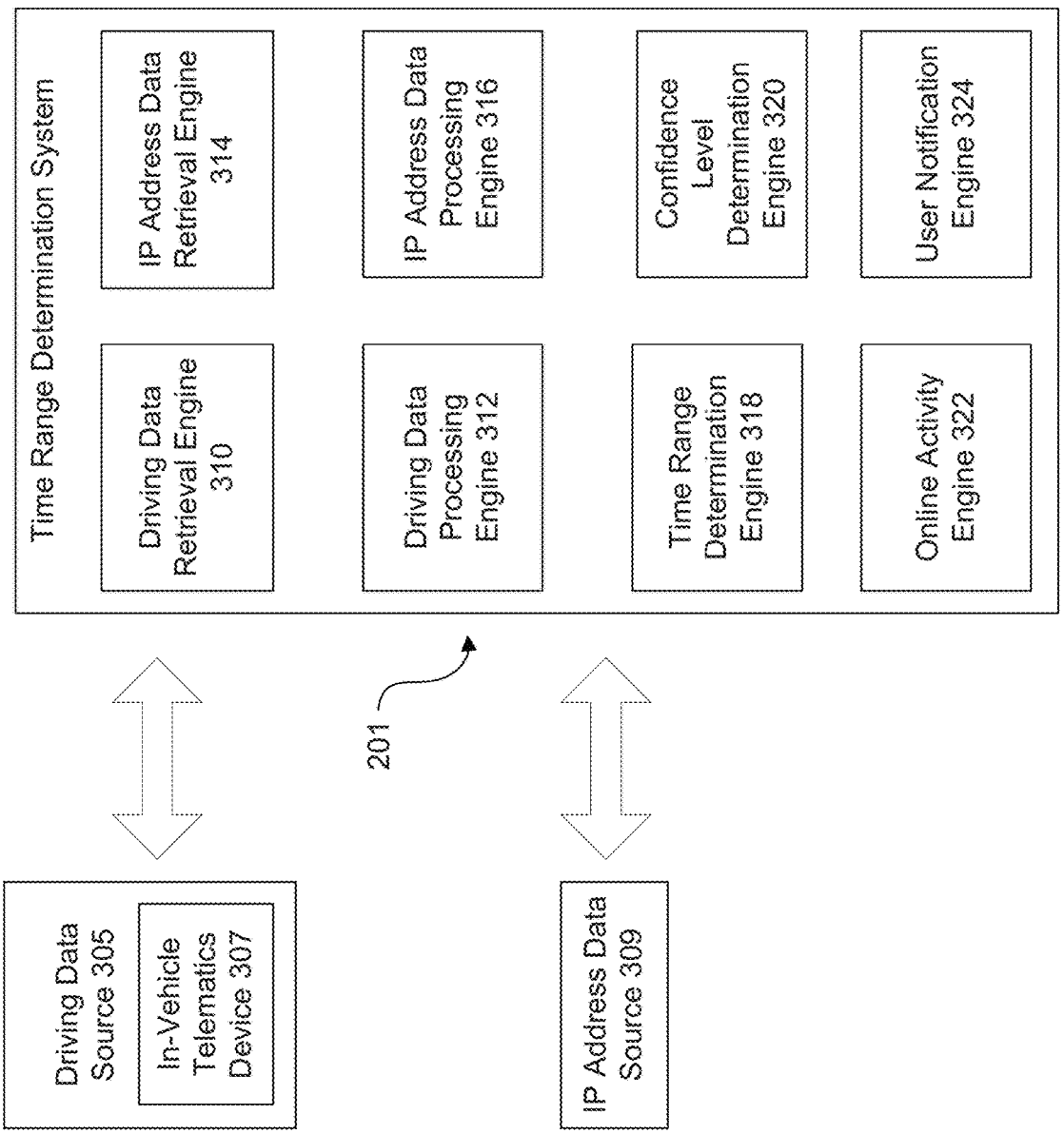
FIG. 3 illustrates a block diagram of a time range determination system that collects information from various data sources to determine a range of time when a driver of the vehicle has a low likelihood of accessing a web resource over a network in accordance with one or more aspects described herein.

FIG. 3 illustrates a block diagram of a time range determination system that collects information from various data sources to determine a range of time when a driver of the vehicle has a low likelihood of accessing a web resource over a network in accordance with one or more aspects described herein. As shown in FIG. 3, the time range determination system 201 may communicate with driving data source 305 to collect driving data. In some embodiments, driving data source 305 may include an in-vehicle telematics device 307. The time range determination system 201 may communicate with IP address data source 309 to collect IP address data.

In some embodiments, the time range determination system 201 may comprise a driving data retrieval engine 310, driving data processing engine 312, IP address data retrieval engine 314, IP address data processing engine 316, time range determination engine 318, confidence level determination engine 320, online activity engine 322, and user notification engine 324.

The driving data retrieval engine 310 may be configured to retrieve a driving data, such as, for example, a user's telematics information, such as location, velocity, direction of travel, route, and destination, from driving data source 305. As described herein, driving data source 305 may include an in-vehicle telematics device 307. In some embodiments, driving data source 305 may comprise a user computing device associated with a driver and/or a passenger of a vehicle. Driving data may include one or more of geo-location data, an IP address of the computing device in a vehicle, data indicative of whether a computing device is in possession of a driver of a vehicle or a passenger of a vehicle, speed of a vehicle, acceleration data associated with a vehicle, and biometric data associated with the driver or the passenger.

The driving data processing engine 312 may evaluate and analyze driving data such as telematics information. In some embodiments, driving data processing engine 312 may include a telematics module that may be further configured to analyze the telematics information. The telematics module may be in communication with the in-vehicle telematics device 307, wherein the in-vehicle telematics device 307 sends the telematics information directly to the telematics module. The telematics module may further calculate and provide information regarding distance traveled from an origin, time to travel to a destination, route information, etc. Additionally, for example, through various historical driving telematics information, the telematics module may determine a driving pattern of a user. The telematics module may know that a user may be driving a vehicle equipped with in-vehicle telematics device 307 on their way home from work or through one of their known routes. The telematics module may know and track the routes of the user based on the telematics information and the insurance information.

Time range determination engine 318 may determine, based on the driving data, a range of time when a driver of the vehicle has a low likelihood of accessing a web resource over a network. For example, time range determination engine 318 may analyze driving data to determine a range of time when a driver is driving a vehicle. Based upon such determination, time range determination engine 318 may infer that the driver is unlikely to be able to access a web resource to initiate and/or complete a transaction online.

Figure 4:
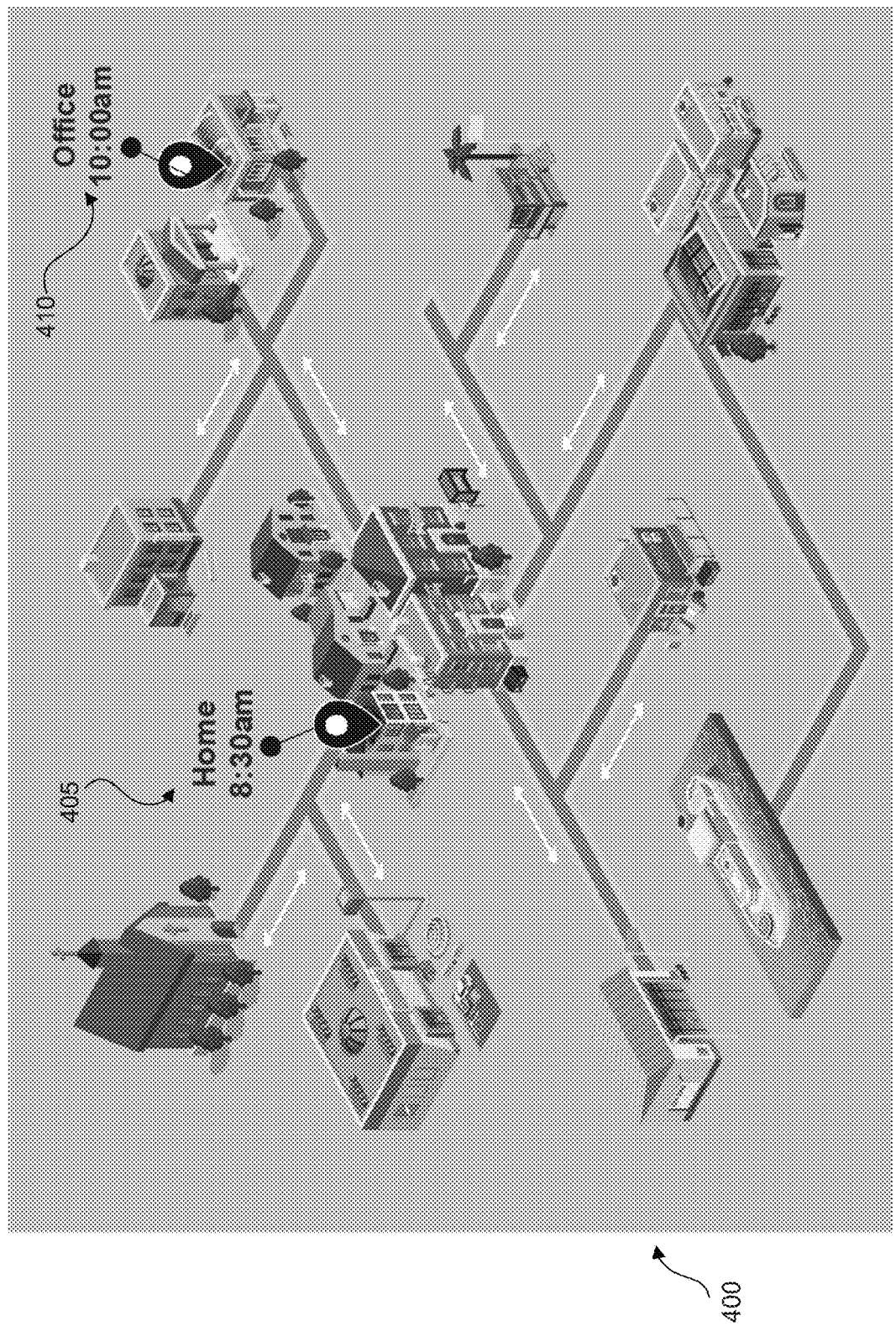
FIG. 4 illustrates a determined exemplary range of time when a driver of a vehicle has a low likelihood of accessing a web resource in accordance with one or more aspects described herein.

FIG. 4 illustrates a determined exemplary range of time 400 when a driver of a vehicle has a low likelihood of accessing a web resource in accordance with one or more aspects described herein. For example, time range determination system 201 may analyze driving data to determine that the driver begins a trip by leaving home 405 at 8:30 A.M. Also, for example, time range determination system 201 may analyze driving data to determine that the driver ends the trip by arriving at office 410 at 10:00 A.M. Accordingly, time range determination system 201 may determine a range of time 8:30 A.M.-10:00 A.M. as when the driver is unlikely to access a web resource via a mobile device. In some embodiments, time range determination system 201 may associate the determined range of time as a time when the driver of the vehicle has a low likelihood of accessing a web resource.

Figure 5:
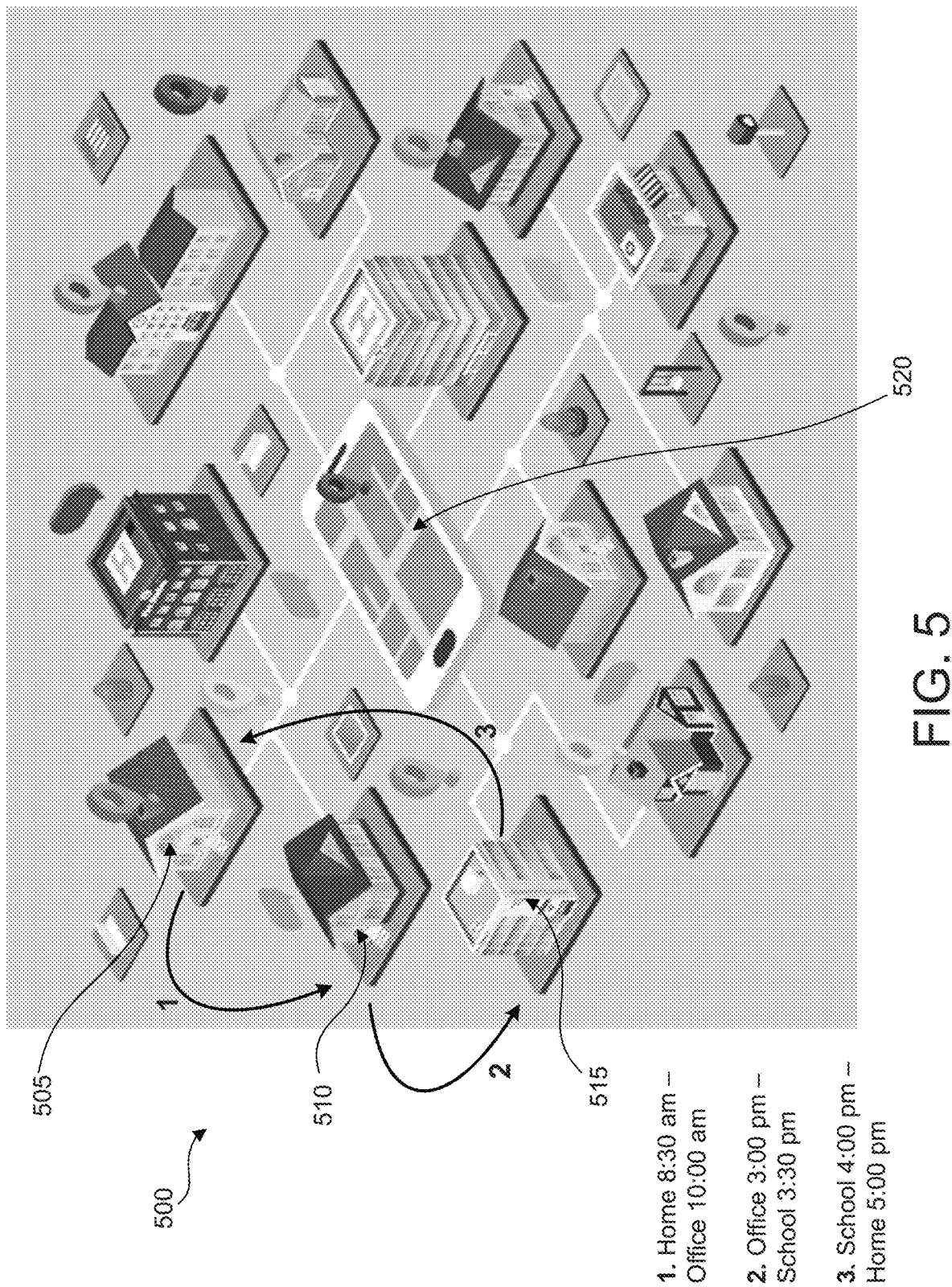
FIG. 5 illustrates another determined exemplary range of time when a driver of a vehicle has a low likelihood of accessing a web resource in accordance with one or more aspects described herein.

FIG. 5 illustrates another determined exemplary range of time 500 when a driver of a vehicle has a low likelihood of accessing a web resource in accordance with one or more aspects described herein. For example, time range determination system 201 may analyze driving data to determine that the driver begins a trip by leaving home 505 at 8:30 A.M. Also, for example, time range determination system 201 may analyze driving data to determine that the driver ends the trip by arriving at office 510 at 10:00 A.M. Accordingly, time range determination system 201 may determine a first range of time 8:30 A.M.-10:00 A.M., as indicated by arrow 1, when the driver is unlikely to access a web resource via mobile device 520.

Also, for example, time range determination system 201 may analyze driving data to determine that the driver begins a trip by leaving office 510 at 3:00 P.M., arrives at school 515 at 3:30 P.M. to pick up a child. Accordingly, time range determination system 201 may determine a second range of time 3:00 P.M.-3:30 P.M., as indicated by arrow 2, when the driver is unlikely to access a web resource via mobile device 520. As another example, time range determination system 201 may analyze driving data to determine that the driver leaves school 515 at 4:00 P.M., and arrives back at home 505 at 5:00 P.M. Accordingly, time range determination system 201 may determine a third range of time 4:00 P.M.-5:00 P.M., as indicated by arrow 3, when the driver is unlikely to access a web resource via mobile device 520.

In some embodiments, time range determination system 201 may associate the determined ranges of time as times when the driver of the vehicle has a low likelihood of accessing a web resource. For example, time range determination system 201 may associate a list such as, for example, "8:30 A.M.-10:00 A.M.; 3:00 P.M.-3:30 P.M.; 4:00 P.M.-5:00 P.M." as ranges of time when the driver of the vehicle has a low likelihood of accessing a web resource.

Referring again to FIG. 3, IP address data retrieval engine 314 may be configured to retrieve IP address data from one or more external sources, retrieve an IP address for a computing device in a vehicle (e.g., an in-vehicle telematics device, a user computing device, etc.), and/or retrieve an IP address for an unauthorized computing device. For example, IP address data retrieval engine 314 may retrieve information indicating that IP addresses in the state of Ohio are in the range "10.10.8.xx". Also, for example, IP address data retrieval engine 314 may retrieve information indicating that IP addresses in the state of Florida are in the range "2.4.6.xx." As another example, IP address data retrieval engine 314 may communicate with driving data retrieval engine 310, and/or driving data processing engine 312, to retrieve an IP address for an in-vehicle telematics device as "10.10.8.18". Also, for example, IP address data retrieval engine 314 may retrieve an IP address for an unauthorized computing device as "2.4.6.72".

The IP address data processing engine 316 may process the IP address data retrieved by IP address data retrieval engine 314. For example, the IP address data processing engine 316 may be configured to associate geographic regions with IP addresses and store such information in a database (e.g., central data storage platform 218 in FIG. 2). In some embodiments, the association between geographic regions and IP addresses may be stored in a format searchable by a computer. The IP address data processing engine 316 may be configured to compare IP addresses associated with geographic regions.

For example, IP address data processing engine 316 may compare the IP address for the in-vehicle telematics device "10.10.8.18" to an IP address listing by geographic region (e.g., in a lookup table). Accordingly, IP address data processing engine 316 may match "10.10.8.18" to a range "10.10.8.xx", and thereby identify the geographic region to be "Ohio". Accordingly, IP address data processing engine 316 may determine that the vehicle itself is in Ohio.

As another example, IP address data processing engine 316 may compare the IP address for the unauthorized computing device "2.4.6.72" to an IP address listing by geographic region (e.g., in a lookup table). Accordingly, IP address data processing engine 316 may match "2.4.6.72" to a range "2.4.6.xx", and thereby identify the geographic region to be "Florida". Accordingly, IP address data processing engine 316 may determine that the unauthorized computing device itself is in Florida, and that a potentially unauthorized account access may have originated from Florida (and not from Ohio).

Confidence level determination engine 320 may be configured to associate, with the determined range of time, a confidence level indicative of a strength of determining the range of time. Generally, a higher confidence level is indicative of a greater degree of certainty that a driver of a vehicle is unable to access a web resource during the associated range of time. On the other hand, a lower confidence level is indicative of a lower degree of certainty that a driver of a vehicle is unable to access a web resource during the associated range of time.

In some embodiments, the confidence level may be based on driving data. For example, time range determination engine 318 may analyze driving data to determine that the driver is driving the vehicle at 70 miles per hour on a highway. Accordingly, a likelihood that the driver will access a web resource during the determined range of time is low. Based on such determination, confidence level determination engine 320 may be configured to associate a high level of confidence with the range of time. As another example, time range determination engine 318 may analyze driving data to determine that the driver is in a vehicle in heavily stalled traffic. Accordingly, a likelihood that the driver will access a web resource during the determined range of time is high. Based on such a determination, confidence level determination engine 320 may be configured to associate a low level of confidence with the range of time.

Time range determination system 201 may analyze driving data such as data from an accelerometer, a braking device, traffic data, weather data, location data (e.g., GPS data, Wi-Fi data, and so forth) to determine a location of a vehicle, a speed, terrain, type of traffic, and so forth, to determine the confidence level. For example, driving data may be indicative of driving activity that may require the driver to be at a high level of alertness. For example, driving data may indicate that the vehicle is being driven in a hilly area, in a snowstorm, over icy roads, and/or in low visibility due to fog or heavy rain. Accordingly, time range determination system 201 may determine that a likelihood that the driver will access a web resource during the determined range of time is low.

Also, for example, in some embodiments, driving data may include biometric data for a driver of the vehicle. For example, an electro-cardiogram meter ("ECG meter") in a steering wheel of the vehicle may identify a unique ECG signature for a driver of the vehicle. Such unique signature may further confirm that the driver is in the vehicle, and allow time range determination engine 318 to associate the vehicle's coordinates with the driver's coordinates. Similar determinations may be made based on biometric data such as breathing data, retinal scanning data, fingerprint data, voice data, and so forth.

In some embodiments, time range determination engine 318 may analyze data from the ECG and/or finger print sensors on the steering wheel of the vehicle to determine that the driver has both hands on the steering wheel. Accordingly, time range determination engine 318 may infer that the driver is not physically accessing the mobile device. Also, for example, voice recognition software may analyze ambient noise to determine that the driver is not providing verbal instructions to the mobile device. Accordingly, time range determination engine 318 may infer, with a very high degree of certainty, that the driver is not accessing a web resource to conduct online activity.

In some embodiments, driving data may indicate if an individual in a vehicle is a driver or a passenger of the vehicle. Time range determination engine 318 may associate a higher confidence level with a determined range of time when the individual is identified as a driver of the vehicle, and therefore less likely to engage in online activities. Also, for example, time range determination engine 318 may associate a lower confidence level with a determined range of time when the individual is identified as a passenger of the vehicle, and therefore more likely to engage in online activities.

In some embodiments, time range determination system 201 may determine that a vehicle is in parked position, and associate a low level of confidence with a range of time when the vehicle is in the parked position.

In some embodiments, one or more factors such as location data, IP address data, biometric data, and so forth, may be combined to determine an aggregate confidence level. For example, each additional data may cause the confidence level to increase or decrease based on the type of information in the data. For example, location data may indicate that the driver of a vehicle is in Ohio. The IP address data associated with an in-vehicle telematics device may further confirm that the vehicle is in Ohio. Accordingly, the confidence level associated with the determined range of time may be increased. However, in some instances, account activity data may indicate that an IP address associated with the online activity is in Ohio. In such an instance, the confidence level associated with the determined range of time may be decreased. However, if additional driving data indicates that the driver had both hands on the steering wheel, then this may indicate that the online activity in Ohio was likely not performed by the driver, even though the driver was located in Ohio, and the online activity was traced to Ohio. Accordingly, the confidence level associated with the determined range of time may be increased. Also, for example, if voice recognition software indicates that the driver was not providing voice instructions to a mobile device in the vehicle, then this may indicate that the online activity in Ohio was likely not performed by the driver, even though the driver was located in Ohio, and the online activity was traced to Ohio. Accordingly, the confidence level associated with the determined range of time may be increased further. Additionally, and/or alternatively, one or more weights may be assigned to various factors to determine a confidence level.

In some embodiments, the confidence level of a determined range of time may be associated with a type of vehicle. For example, for a non-autonomous vehicle, a driver is unlikely to have an opportunity to conduct online activity, and accordingly a confidence level may be determined to be "High". Also, for example, for a semi-autonomous vehicle, a driver may likely have an opportunity to conduct online activity, and accordingly a confidence level may be determined to be "Medium." As another example, for an autonomous vehicle, a driver is likely to have an opportunity to conduct online activity, and accordingly a confidence level may be determined to be "Low."

In some embodiments, time range determination engine 318 may identify a potentially unauthorized activity based on the confidence level. For example, time range determination engine 318 may determine that a potentially unauthorized activity has taken place during a determined range of time when a confidence level associated with the determined range of time exceeds a threshold. Likewise, time range determination engine 318 may determine that a potentially unauthorized activity has not taken place during a determined range of time when a confidence level associated with the determined range of time is below a threshold. Also, for example, time range determination engine 318 may determine that a potentially unauthorized activity has taken place during a determined range of time when a confidence level associated with the determined range of time is "High." Likewise, time range determination engine 318 may determine that a potentially unauthorized activity has not taken place during a determined range of time when a confidence level associated with the determined range of time is "Low."

Figure 6:
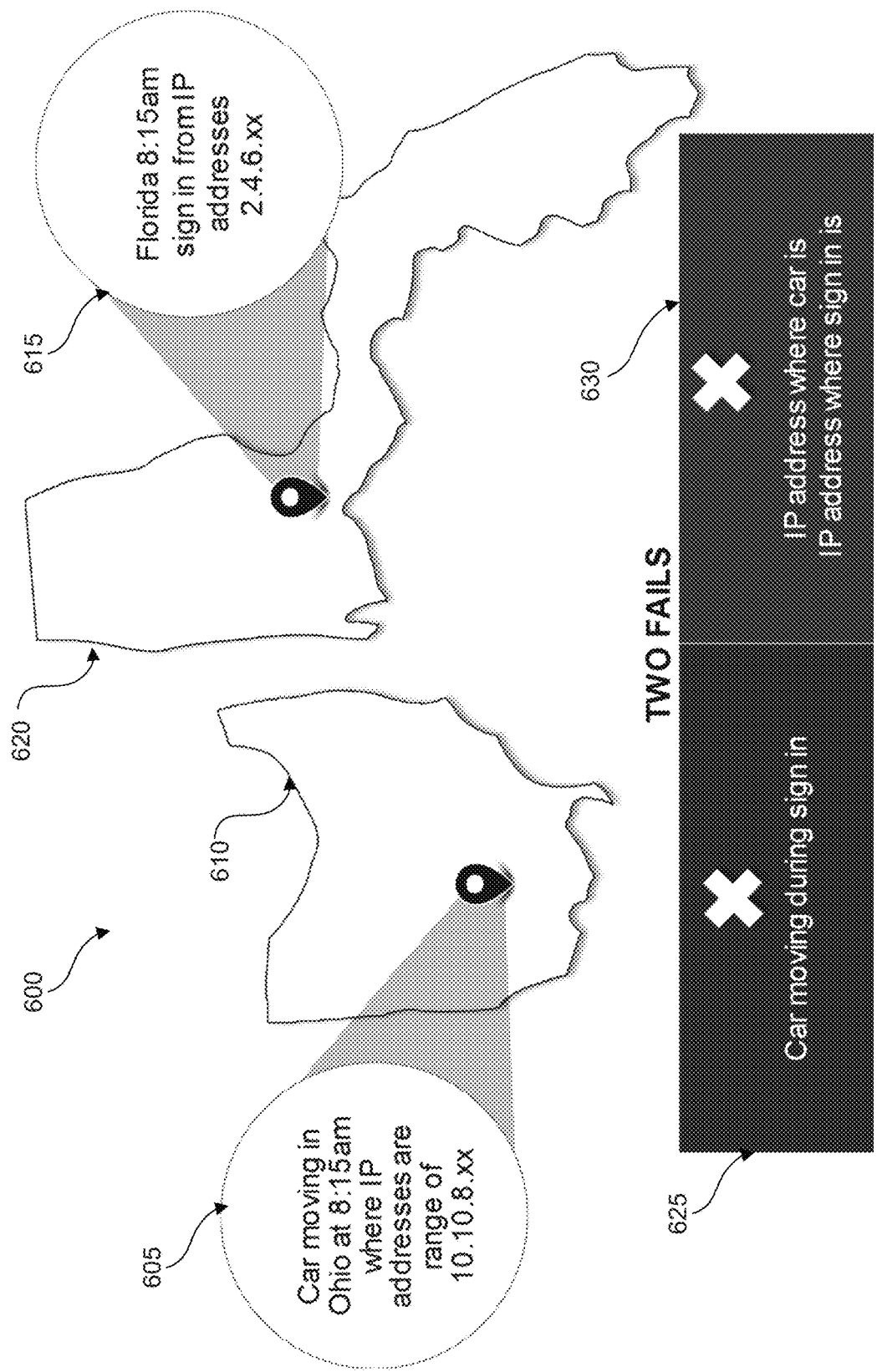
FIG. 6 illustrates an exemplary method of associating a confidence level with a determined range of time in accordance with one or more aspects described herein.

FIG. 6 illustrates an exemplary method 600 of associating a confidence level with a determined range of time in accordance with one or more aspects described herein. For example, time range determination engine 318 may analyze driving data to determine that the driver is driving the vehicle at 8:15 A.M. Based on such determination, time range determination engine 318 may determine the range of time as beginning at 8:15 A.M. and confidence level determination engine 320 may associate a first confidence level with the determined range of time. IP address data processing engine 316 may analyze an IP address, "10.10.8.18", for an in-vehicle telematics device associated with the vehicle, and make a determination 605 that at or about 8:15 A.M., the vehicle is being driven in the state of Ohio 610. Accordingly, confidence level determination engine 320 may associate a second confidence level with the determined range of time.

In some embodiments, the second confidence level may be higher than the first confidence level.

In some embodiments, time range determination system 201 may detect that an online activity has occurred at or about 8:15 A.M. for an account associated with a driver of the vehicle driving in Ohio 610. IP address data processing engine 316 may analyze an IP address "2.4.6.72" associated with the unusual activity, and trace it to an unauthorized computing device. Based on the IP address, IP address data processing engine 316 may make a determination 615 that at or about 8:15 A.M., the unauthorized computing device is in the state of Florida 620. Based on a distance between Ohio 610 and Florida 620, time range determination system 201 may conclude that the online activity originating in Florida 620 could not have been an activity performed by the driver of the vehicle moving in Ohio 610. Accordingly, time range determination system 201 may identify the online activity as a potentially unauthorized activity.

In some embodiments, a higher confidence level associated with the determined range of time may cause time range determination system 201 to infer that a potentially unauthorized activity is an actual unauthorized activity. For example, when a confidence level is above a pre-determined threshold, time range determination system 201 may automatically classify the unusual activity as an unauthorized activity. On the other hand, when a confidence level is below the pre-determined threshold, time range determination system 201 may automatically classify the unusual activity as a potentially unauthorized activity. For example, time range determination system 201 may make a first determination 625 that the vehicle is moving during the unusual activity, and make a second determination 630 that the IP address associated with the vehicle is in Ohio 610, whereas the IP address associated with the unusual activity is in Florida 620. Accordingly, time range determination system 201 may automatically classify the unusual activity as an unauthorized activity.

Referring again to FIG. 3, online activity engine 322 may detect an online activity for an account associated with the driver. For example, online activity engine 322 may be configured to analyze a log of account activity for one or more accounts associated with the driver. The log of account activity may include information such as a time of access, details of the account, details of the transaction, and so forth. In some embodiments, online activity engine 322 may be configured to retrieve the range of time from time range determination engine 318 and compare times of online activities to the range of time. In some embodiments, online activity engine 322 may be configured to compare times of online activities to one or more ranges of time when the driver of the vehicle has a low likelihood of accessing a web resource over a network. In some embodiments, online activity engine 322 may be configured to identify, upon a determination that the time of the online activity is within the range of time, a potentially unauthorized activity.

User notification engine 324 may trigger one or more steps to protect the driver from the potentially unauthorized activity. For example, upon identifying a potentially unauthorized activity, online activity engine 322 may communicate this to user notification engine 324, which may then trigger the one or more steps. For example, if an online activity is detected in an account associated with a person, and it is determined that that person was driving a vehicle, and was not likely to access a web resource to perform the online activity, then user notification engine 324 may prevent the online activity from being completed, and/or take steps to mitigate the effects of the unauthorized online activity.

For example, time range determination system 201 may determine a range of time for a customer as between 8:30 A.M. to 10:00 A.M. Time range determination system 201 may detect an unusual insurance activity associated with the customer's account during the range of time. Accordingly, time range determination system 201 may send an electronic communication (e.g., automated voice call, an electronic mail communication, a text message, and so forth). For example, the unusual insurance activity may be an addition of the customer's 16-year old son as an authorized driver of a luxurious vehicle associated with the customer. Accordingly, time range determination system 201 may send an email to the customer, stating, "Please approve the addition of your child to your vehicle as an authorized driver." As another example, an unusual account activity may comprise a change of address, change of contact information, change of privacy options, addition and/or deletion of payment details, and so forth, and time range determination system 201 may verify such activity with the customer.

As another example, upon identifying a potentially unauthorized activity, online activity engine 322 may communicate this to user notification engine 324, which may provide, to a third party, the determined range of time as a verification service for online activities, such as, for example, financial transactions. For example, a third party, such as a financial loan provider, may access a list of ranges of times ("blackout times") when a customer is unlikely to access a web resource to conduct online activity. Accordingly, if a loan application is submitted on behalf of the customer, and/or other loan related activity is detected during a blackout time, the loan provider may automatically classify the online activity as a potentially unauthorized activity, and initiate steps to mitigate the effects of the unauthorized online activity.

Figure 7:
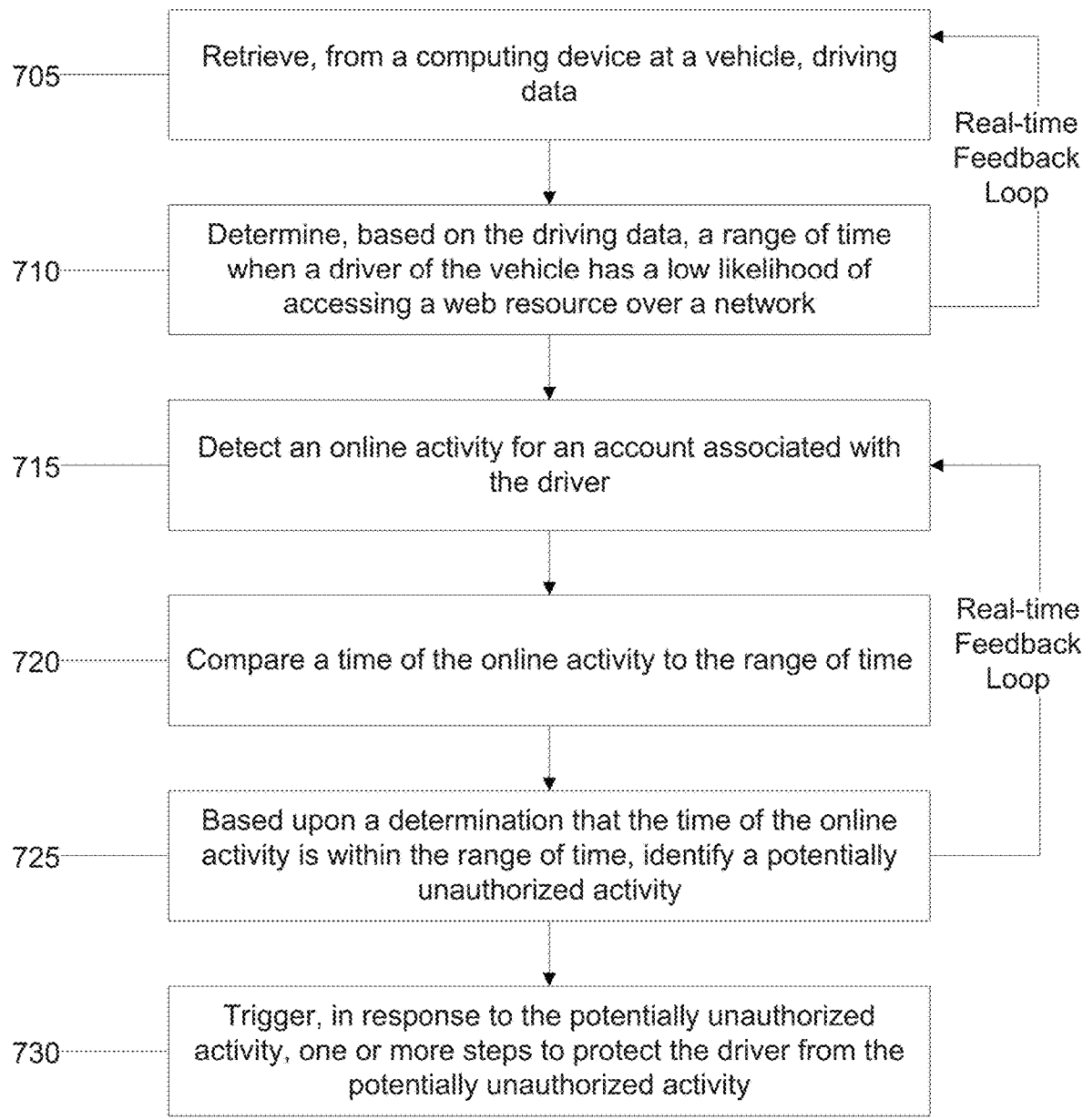
FIG. 7 illustrates an exemplary method for determining a range of time when a driver of a vehicle has a low likelihood of accessing a web resource in accordance with one or more aspects described herein.

The steps that follow in FIG. 7 may be implemented by one or more of the components in FIGS. 1 through 3 and/or other components, including other computing devices. FIG. 7 illustrates an exemplary method for determining a range of time when a driver of a vehicle has a low likelihood of accessing a web resource in accordance with one or more aspects described herein.

At step 705, time range determination system 201 may retrieve, from a computing device at a vehicle, driving data. For example, time range determination system 201 may retrieve geo-location data, an IP address of the computing device in the vehicle, data indicative of whether the computing device is in possession of the driver or a passenger of the vehicle, speed of the vehicle, acceleration data associated with the vehicle, and biometric data associated with the driver or the passenger.

At step 710, time range determination system 201 may determine, based on the driving data, a range of time when a driver of the vehicle has a low likelihood of accessing a web resource over a network. For example, time range determination system 201 may analyze driving data to determine that from 9 A.M. to 10:30 A.M., the driver of the vehicle is or was driving at 70 miles per hour on a freeway, and is therefore unlikely to have accessed the internet during that range of time. Additional and/or alternative determinations for a time range may be made, such as, for example, a day of the week, a date, a month, and so forth.

In some embodiments, time range determination system 201 may return to step 705 to retrieve additional driving data. In some embodiments, time range determination system 201 may continue to retrieve driving data in real time to determine the range of time. For example, time range determination system 201 may determine when a trip begins, a duration of the trip, and retrieve driving data in real-time, and/or during repeated intervals of time, until a determination is made that the trip has stopped.

At step 715, time range determination system 201 may detect an online activity for an account associated with the driver. For example, time range determination system 201 may receive a trigger (e.g., from an enterprise server) that an account associated with the driver of the vehicle was accessed to conduct an online activity.

At step 720, time range determination system 201 may compare a time of the online activity to the range of time. For example, time range determination system 201 may receive data that indicates a time of the online activity, and may compare this time to the determined range of time, such as, for example, 9 A.M. to 10:30 A.M.

At step 725, time range determination system 201 may, based upon a determination that the time of the online activity is within the range of time, identify a potentially unauthorized activity. For example, time range determination system 201 may determine that the online access of the driver's account occurred for about 10 minutes, starting at 9:45 A.M. Accordingly, time range determination system 201 may determine that this is within the determined range of time, 9 A.M. to 10:30 A.M. when the driver was unlikely to have accessed the internet. Accordingly, time range determination system 201 may identify the online access to the driver's account as a potentially unauthorized activity.

In some embodiments, time range determination system 201 may return to step 715 to detect a second online activity for the same and/or another account associated with the driver. In some embodiments, time range determination system 201 may, based on another comparing and upon another determination that the time of the second online activity is within the same and/or another range of time, identify another potentially unauthorized activity. Such steps may be performed in real-time, thereby triggering mitigation activities in real-time.

For example, the time range determination system 201 may determine that the online access of the driver's account occurred for about 5 minutes, starting at 2:00 P.M. In such an instance, the time range determination system 201 may access an enterprise server for a determined range of time when the driver was unlikely to have accessed the internet. If the enterprise server has no such data, the time range determination system 201 may then identify the online access to the driver's account as not being a potentially unauthorized activity.

At step 730, time range determination system 201 may trigger, in response to the potentially unauthorized activity, one or more steps to protect the driver from the potentially unauthorized activity. For example, time range determination system 201 may send an alert notification to the driver. As another example, time range determination system 201 may prevent the potentially unauthorized activity by, for example, detecting the potentially unauthorized activity in real-time, interrupting the online activity, and/or denying access to the account associated with the driver. In some embodiments, time range determination system 201 may provide, to a third party, the determined range of time as a verification service for online activities. For example, time range determination system 201 may compile a list of determined ranges of time when a driver is likely unable to access the internet. Accordingly, time range determination system 201 may provide the compiled list to third parties. For example, a third party server that provides a financial service to the driver may receive the compile list of "blackout times" associated with the driver, and utilize such a compiled list to detect fraudulent and/or unauthorized activity associated with the financial service provided to the driver.

In some embodiments, time range determination system 201 may determine, based on driving data, a first geographical region in which the vehicle is located. For example, geolocation data may indicate that the vehicle is located in Illinois. Time range determination system 201 may determine, based on the first geographical region (e.g., Illinois), a first range of IP addresses (e.g., a range of IP addresses associated with Illinois). Time range determination system 201 may then identify, based on the online activity, a second range of IP addresses. For example, data associated with the online activity may indicate an IP address associated with Florida. Accordingly, time range determination system 201 may compare the first range of IP addresses (e.g., associated with Illinois) with the second range of IP addresses (e.g., associated with Florida), and determine that these ranges do not overlap. In some embodiments, time range determination system 201 may determine a distance between a location of the vehicle in Illinois to the nearest point in Florida, and a time of the online activity and the determined range of time, to infer that it is highly unlikely for the vehicle to travel from Illinois to Florida during the time of the online activity. Based on such determinations, time range determination system 201 may trigger the one or more steps to protect the driver from the potentially unauthorized activity.

Aspects of the invention have been described in terms of illustrative embodiments thereof. Numerous other embodiments, modifications, and variations within the scope and spirit of the appended claims will occur to persons of ordinary skill in the art from a review of this disclosure. For example, one of ordinary skill in the art will appreciate that the steps illustrated in the illustrative figures may be performed in other than the recited order, and that one or more steps illustrated may be optional in accordance with aspects of the invention.

What is claimed is:

1. A method comprising:
   retrieving, from a computing device at a vehicle, driving data;
   determining, based on the driving data, a range of time when a driver of the vehicle has a low likelihood of accessing a web resource over a network; and
   providing, to a third party, the range of time as a verification service for online activities.

2. The method of claim 1, further comprising:
   determining a confidence level associated with the range of time, wherein the confidence level is indicative of a level of certainty that the driver of the vehicle was unable to access the web resource during the range of time, and wherein the confidence level is based on the driving data.

3. The method of claim 1, wherein the computing device at the vehicle comprises an in-vehicle telematics device.

4. The method of claim 1, wherein the determining the range of time when the driver of the vehicle has the low likelihood of accessing the web resource over the network is based on a determination that the driver was driving the vehicle at a pre-determined speed.

5. The method of claim 1, wherein the driving data comprises one or more of geo-location data, data indicative of whether the computing device is in possession of the driver or a passenger of the vehicle, a speed of the vehicle, acceleration data associated with the vehicle, and biometric data associated with the driver or the passenger.

6. The method of claim 5, wherein the driving data comprises the geo-location data, the method further comprising:
  determining a driving pattern of the driver, wherein the determining the range of time is based on the driving pattern.

7. The method of claim 1, further comprising:
  storing an association of the driver and a plurality of determined ranges of time during which the driver was unlikely to have accessed online resources.

8. The method of claim 1, wherein the retrieving the driving data is responsive to a request, from the third party, for the range of time.

9. A method comprising:
  retrieving, from a telematics device at a vehicle, driving data;
  determining, based on the driving data, a plurality of ranges of time when a driver of the vehicle had a low likelihood of accessing a web resource over a network; and
  providing, to a third party, the plurality of ranges of time as a verification service for online activities.

10. The method of claim 9, further comprising:
  associating, with at least one range of time of the plurality of ranges of time, a confidence level indicative of a level of certainty that the driver of the vehicle was unable to access the web resource during the at least one range of time, wherein the confidence level is based on the driving data.

11. The method of claim 9, wherein the determining the plurality of ranges of time when the driver of the vehicle had the low likelihood of accessing the web resource over the network is based on a determination that the driver was driving the vehicle at a pre-determined speed.

12. The method of claim 9, wherein the driving data comprises one or more of geo-location data, a speed of the vehicle, acceleration data associated with the vehicle, and biometric data associated with the driver or a passenger.

13. The method of claim 12, wherein the driving data comprises the geo-location data, the method further comprising:
  determining a driving pattern of the driver, wherein the determining the plurality of ranges of time is based on the driving pattern.

14. The method of claim 9, further comprising:
  storing an association of the driver and the plurality of ranges of time when the driver was unlikely to have accessed online resources.

15. The method of claim 9, wherein the retrieving the driving data is responsive to a request, from the third party, for the plurality of ranges of time.

16. A method comprising:
  responsive to a request, from a third party, for a verification service for online activities associated with a driver of a vehicle, retrieving, from a computing device at the vehicle, driving data;
  determining, based on the driving data, that the driver has a low likelihood of accessing a web resource over a network; and
  providing, to the third party, an indication of the low likelihood.

17. The method of claim 16, further comprising:
  determining a confidence level, wherein the confidence level is indicative of a level of certainty that the driver of the vehicle is unable to access the web resource, and wherein the confidence level is based on the driving data.

18. The method of claim 16, wherein the computing device comprises a smartphone.

19. The method of claim 16, wherein the determining that the driver has the low likelihood of accessing the web resource over the network is based on a determination that the driver is driving the vehicle at a pre-determined speed.

20. The method of claim 16, wherein the driving data comprises one or more of geo-location data, data indicative of whether the computing device is in possession of the driver or a passenger of the vehicle, a speed of the vehicle, acceleration data associated with the vehicle, and biometric data associated with the driver or the passenger.

* * * * *